United States Patent [19]
Luibrand

[11] Patent Number: 5,505,276
[45] Date of Patent: Apr. 9, 1996

[54] POER STEERING SYSTEM WITH MINIMUM PRESSURE MAINTAINED WITHIN THE POWER STEERING MOTOR

[75] Inventor: Thomas W. Luibrand, Kingsport, Tenn.

[73] Assignee: TRW Inc., Lyndhurst, Ohio

[21] Appl. No.: 326,593

[22] Filed: Oct. 20, 1994

[51] Int. Cl.$^6$ ............................... B62D 5/06; B62D 5/08; F16J 15/18
[52] U.S. Cl. ............................ 180/132; 91/467; 180/148; 180/DIG. 18
[58] Field of Search ..................................... 180/132, 148, 180/DIG. 10, DIG. 13, DIG. 18; 91/467, 436

[56] References Cited

U.S. PATENT DOCUMENTS

| | | | |
|---|---|---|---|
| 3,444,948 | 5/1969 | Bianchetta et al. | 180/148 |
| 4,211,152 | 7/1980 | Colletti et al. | 92/168 |
| 4,276,812 | 7/1981 | Dymond | 91/467 |
| 4,557,342 | 12/1985 | Drutchas | 180/132 |
| 4,558,759 | 12/1985 | Baatrup et al. | 180/132 |
| 4,940,104 | 7/1990 | Hasegawa | 180/132 |
| 5,147,007 | 9/1992 | Kahrs et al. | 180/132 |
| 5,186,272 | 2/1993 | Smith | 180/132 |
| 5,257,670 | 11/1993 | Miller et al. | 180/132 |

Primary Examiner—Mitchell J. Hill
Attorney, Agent, or Firm—Tarolli, Sundheim, Covell, Tummino & Szabo

[57] ABSTRACT

A power steering system (10) for use in a vehicle includes a power steering pump (12) which is driven by an engine (13) of the vehicle. The output from the power steering pump (12) is connected to a power steering valve (22). The power steering valve (22) is connected with a power steering motor (24). When the engine (13) is turned off, that is, in a non-operating condition, and the power steering pump (12) is not being driven, the fluid pressure in motor cylinder chambers (40, 42) is prevented from falling below a predetermined pressure to keep seals (64, 66) in sealing engagement with the power steering motor 24. To keep the fluid pressure in the motor cylinder chambers (40, 42) from falling below a predetermined pressure, a one-way valve (70) blocks the flow of fluid from the power steering valve (22) back to the reservoir (16). A pressure relief valve (72) blocks the flow of fluid from the power steering valve (22) to the reservoir (16) when the fluid pressure in the motor cylinder chambers (40, 42) is equal to or less than the predetermined pressure required to urge seals (64, 66) into sealing engagement with the power steering motor 24.

6 Claims, 2 Drawing Sheets

POER STEERING SYSTEM WITH MINIMUM PRESSURE MAINTAINED WITHIN THE POWER STEERING MOTOR

BACKGROUND OF THE INVENTION

The present invention relates to a new and improved vehicle power steering system and, more specifically, to a vehicle power steering system which includes a power steering pump, a power steering motor for turning steerable vehicle wheels, and a power steering valve for controlling fluid pressure supplied by the power steering pump to the power steering motor.

The general construction and mode of operation of a vehicle power steering system is well known. Upon rotation of a vehicle steering wheel, a pinion meshes with the teeth of a rack bar, thus moving the rack axially. Also, a power steering valve directs fluid pressure supplied by a power steering pump to one of two motor cylinder chambers of a power steering motor. The other motor cylinder chamber is connected with a reservoir through the power steering valve. This results in the hydraulic assistance of the power steering motor to turn steerable vehicle wheels.

The motor cylinder chambers have seals which are urged into sealing engagement with components of the power steering motor by the fluid pressure in the motor cylinder chambers. When the fluid pressure in the motor cylinder chambers falls below a predetermined pressure such as 40 psi, the fluid pressure in the motor cylinder chambers is not great enough to urge damaged or otherwise imperfect motor cylinder seals into sealing engagement with the components of the power steering motor. Thus, fluid may leak from the power steering motor and/or foreign material may enter the motor and further damage the seals. When the power steering pump is not driven, such as when the engine is turned off, the fluid pressure within the motor cylinder chambers typically falls below the predetermined pressure. The fluid pressure within the motor cylinder chambers also may fall below the predetermined pressure when the power steering valve which may be "open center" is in a neutral position directing fluid pressure from the power steering pump to both motor cylinder chambers equally.

SUMMARY OF THE INVENTION

The present invention prevents the fluid pressure within the power steering motor from falling below a predetermined pressure. The predetermined pressure is equal to the pressure necessary to urge motor cylinder seals into proper sealing engagement with components of a power steering motor.

In accordance with the present invention, a pressure relief valve is provided between the power steering valve and the reservoir. The pressure relief valve blocks fluid flow from the power steering valve to the reservoir when the pressure within the power steering motor is equal to or less than the predetermined pressure. In addition, a one-way valve is provided between the power steering pump and the power steering valve. The one-way valve blocks fluid flow from the power steering valve back to the power steering pump when the fluid pressure within the power steering valve is greater than the output pressure of the power steering pump.

BRIEF DESCRIPTION OF THE DRAWINGS

The foregoing and other features of the present invention will become more apparent to one skilled in the art to which the present invention relates upon consideration of the following description of the invention with reference to the accompanying drawings, wherein.

DESCRIPTION OF ONE SPECIFIC PREFERRED EMBODIMENT OF THE INVENTION

Figure 1:
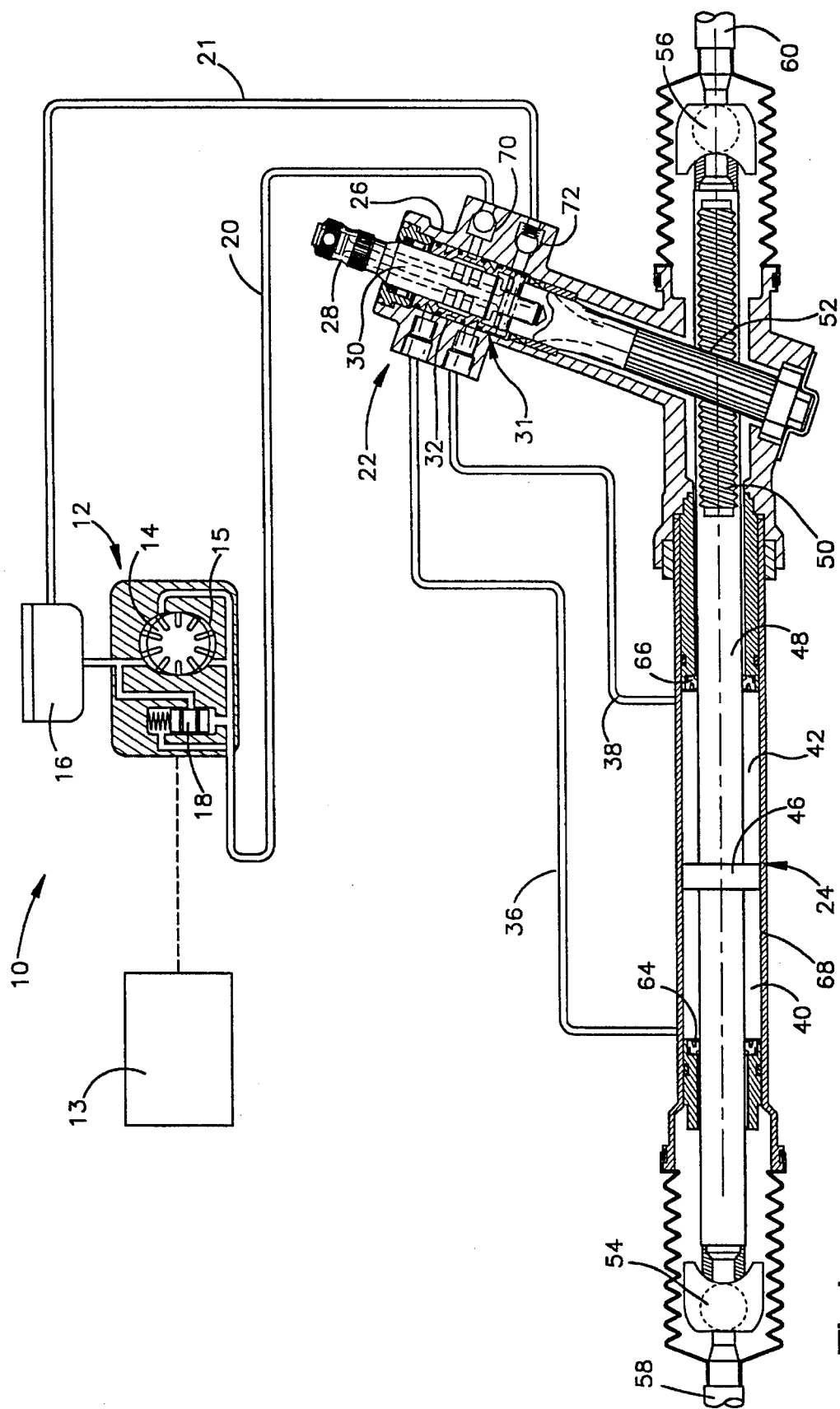
FIG. 1 is a schematic sectional view of a vehicle power steering system.

A vehicle power steering system 10 (FIG. 1) includes a power steering pump 12 which is driven by an engine 13 of a vehicle. The power steering pump 12 includes a rotor 14 which is driven by the engine 13 and disposed in a pump chamber 15. The pump chamber 15 is supplied with fluid at atmospheric pressure from a reservoir 16. A pressure relief valve assembly 18 limits the output pressure from the power steering pump 12. A conduit 20 provides fluid communication between the power steering pump 12 and a power steering valve 22. A conduit 21 provides fluid communication between the power steering valve 22 and the reservoir 16.

The power steering valve 22 controls fluid operation of a power steering motor 24. The power steering valve 22 is of the open center type and includes a housing 26 into which a rotatable input member 28 extends. The rotatable input member 28 is connected with a vehicle steering wheel (not shown) and a rotatable valve core 30. The core 30 is mechanically connected to a pinion 52 via a torsion bar. Rack gear teeth 50 (FIG. 1) are disposed on an axially movable cylindrical rack or first part 48. The rack gear teeth 50 engage teeth of the pinion 52. The core 30, is disposed within a rotatable valve sleeve 32, cooperates with the valve sleeve 32 to direct fluid pressure supplied by the power steering pump 12 to the power steering motor 24. The core 30 and the valve sleeve 32 combine to comprise a valve assembly 31 which is disposed in the housing 26 of the power steering valve 22.

A pair of conduits 36 and 38 provide fluid communication between the power steering motor 24 and the power steering valve 22. The conduits 36 and 38 are connected with respective motor cylinder chambers 40 and 42 of the power steering motor 24. A circular piston 46, fixedly connected to the cylindrical rack bar 48 disposed within the power steering motor 24, separates the motor cylinder chambers 40 and 42. Suitable seals 64 and 66 are provided in the power steering motor 24 to block fluid leakage between the rack bar 48 and a power steering motor housing or second part 68.

Figure 4:
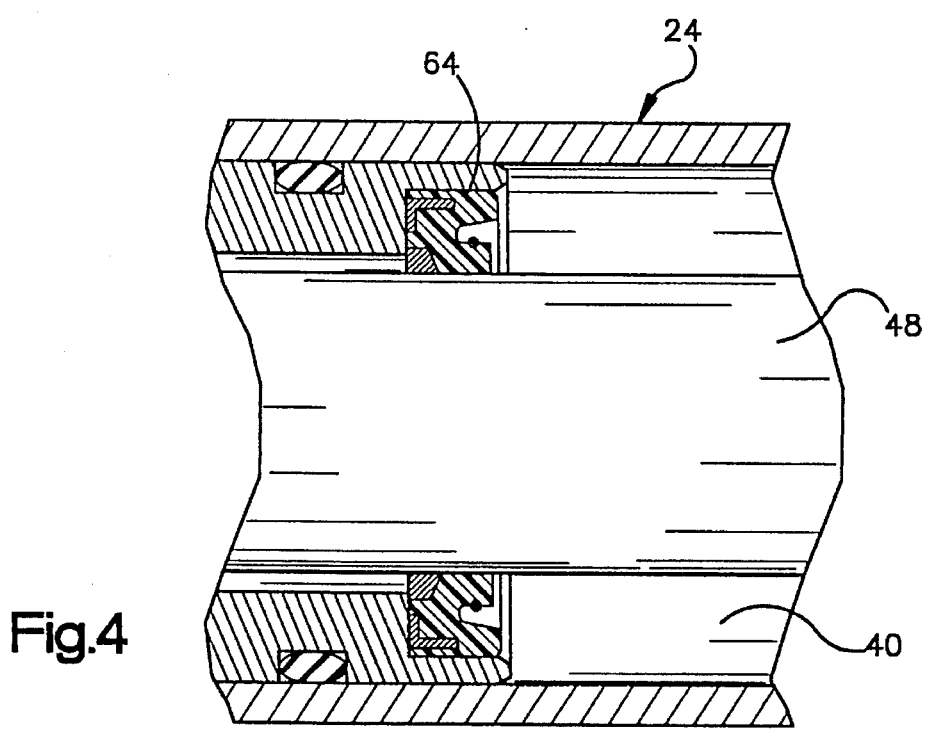
FIG. 4 is an enlarged schematic sectional view of a seal used in a power steering motor in the power steering system of FIG. 1.

The seals 64 and 66 in the power steering motor 24 (FIGS. 1 and 4) have a known construction and are energized by fluid pressure. Thus, the fluid pressure in the motor cylinder chamber 40 urges the seal 64 (FIG. 4) into engagement with the rack bar 48. The seal 66 is urged into engagement with the rack bar 48 (FIG. 1) in the same manner as the seal 64. If desired, the seals 64 and 66 may have a construction similar to the construction disclosed in U.S. Pat. No. 4,211,152.

If the fluid pressure in the motor cylinder chamber 40 or 42 is less than a predetermined pressure such as 40 psi, the fluid pressure applied to the seal 64 or 66 is ineffective to press the seal against the rack bar 48 with sufficient force to provide a fluid tight seal if the seal or rack bar is damaged such as scored. However, if the fluid pressure in the motor cylinder chamber 40 or 42 is equal to or greater than the predetermined pressure, the fluid pressure is effective to press the seals 64 or 66 against the rack bar 48 with sufficient force to provide a fluid tight seal even though the seal or rack bar is damaged.

The general construction and mode of operation of the vehicle power steering system 10 is well known. It is contemplated that the vehicle power steering system 10 may have a construction and mode of operation which is generally similar to the construction and mode of operation of the power steering system disclosed in U.S. Pat. No. 4,276,812.

To operate the system 10, the vehicle operator turns the vehicle steering wheel (not shown) to rotate the input member 28 and the valve core 30. The core 30 rotates the pinion 52 which is engaged with the rack gear teeth 50 and moves the rack bar 48 axially to turn steerable vehicle wheels through a pair of ball joints and tie rod ends. The core 30 and the valve sleeve 32 cooperate to assist the vehicle operator by directing pressure supplied by the power steering pump 12 to one of the motor cylinder chambers 40 or 42. The core 30 and valve sleeve 32 also cooperate to connect the other motor cylinder chamber to the reservoir 16.

In accordance with the present invention, a one-way valve 70 (FIG. 1) is provided between the power steering pump 12 and the power steering valve 22. The one-way valve 70 blocks fluid flow from the power steering valve 22 back to the reservoir 16 through the conduit 20 and power steering pump 12. The one-way valve 70 has a well known construction and includes a spherical ball valve element 76 (FIG. 2) disposed in a housing 78. The housing 78 has a generally conical valve seat 80 which is engagable with the ball valve element 76. The generally conical valve seat 80 of the housing 78 is in fluid communication with the conduit 20. The side of the housing 78 opposing the generally conical valve seat 80 is in fluid communication with the power steering valve 22.

In the illustrated embodiment of the invention, the one-way valve 70 is mounted in the housing 26 of the power steering valve 22. However, it is contemplated that the one-way valve 70 could be spaced from the housing 26.

Figure 2:
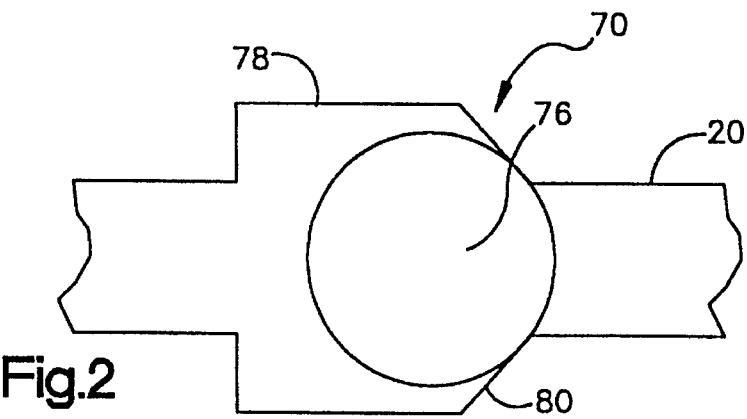
FIG. 2 is a schematic illustration of a one-way valve used in the power steering system of FIG. 1.

When the output pressure of the power steering pump 12 is greater than the fluid pressure in the power steering valve 22, the ball valve element 76 is forced to the left as viewed in FIG. 2. This allows fluid to flow from the right to the left (as seen in FIG. 2) through the one-way valve 70. Thus, fluid may flow from the power steering pump 12 (FIG. 1) to the power steering valve 22 through the conduit 20.

When the output pressure of the power steering pump 12 is less than the fluid pressure in the power steering valve 22, the fluid pressure within the power steering valve will urge the ball valve element 76 to the right as viewed in FIG. 2. Thus, the ball valve element 76 will move into sealing engagement with the generally conical valve seat 80 of the housing 78 to block fluid flow from the left to the right as viewed in FIG. 2. Therefore, fluid flow from the power steering control valve 22 back to the reservoir 16 through the conduit 20 and power steering pump 12 will be blocked.

If the one-way valve 70 were omitted, fluid may flow from the control valve 22 back to the reservoir 16 through the conduit 20 and power steering pump 12. Therefore, when the pressure in the power steering valve 22 is greater than the output pressure of the power steering pump 12, fluid would be able to flow from the power steering valve through the conduit 20 and the pump chamber 15, around the rotor 14 to the reservoir 16. Thus, the one-way valve 70 prevents the back flow of fluid from the power steering valve 22 to the reservoir 16 through the conduit 20 and power steering pump 12.

Further, a pressure relief valve 72 is provided between the power steering valve 22 and the reservoir 16 (FIG. 1). When the fluid pressure within the motor cylinder chamber 40 or 42 is equal to or less than the predetermined fluid pressure, the pressure relief valve 72 blocks fluid flow from the power steering valve 22 to the reservoir 16 through the conduit 21.

In the illustrated embodiment of the invention, the pressure relief valve 72 is mounted in the housing 26 of the power steering valve 22. However, it is contemplated that the pressure relief valve 72 could be spaced from the housing 26.

The pressure relief valve 72 (FIG. 3) includes a spherical ball valve element 84 which is disposed in a housing 86. A helical coil biasing spring 90, disposed in the housing 86, presses the ball valve element 84 into sealing engagement with a generally conical valve seat 88 of the housing 86. The generally conical valve seat 88 is in fluid communication with the power steering valve 22. The side of the housing 86 opposing the generally conical valve seat 88 is in fluid communication with the conduit 21.

Figure 3:
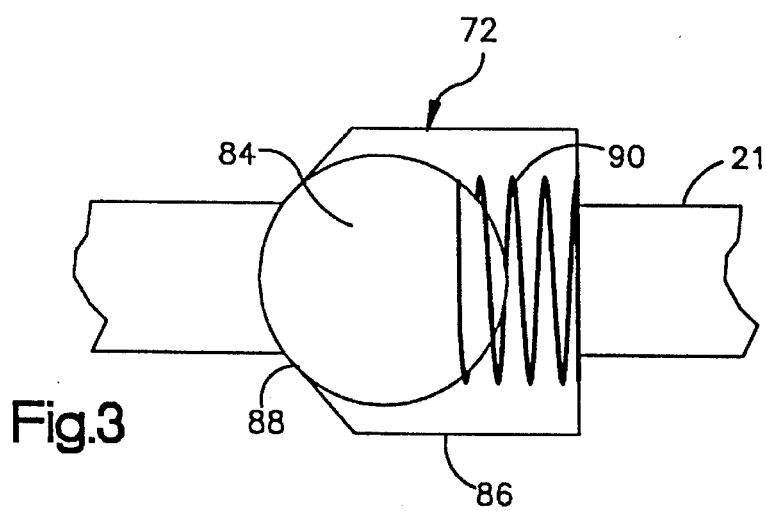
FIG. 3 is a schematic illustration of a pressure relief valve used in the power steering system of FIG. 1.

When the pressure within the motor cylinder chamber 40 or 42 is less than or equal to the predetermined pressure, the biasing spring 90 will force the ball valve element 84 towards the left as seen in FIG. 3. Thus, biasing spring 90 forces the ball valve element 84 into sealing engagement with the generally conical valve seat 88 of the housing 86 to block fluid flow from the left to the right as viewed in FIG. 3. Therefore, fluid flow from the power steering valve 22 to the reservoir 16 through the conduit 21 will be blocked.

When the fluid pressure within the motor cylinder chambers 40 and 42 is greater than the predetermined pressure, the fluid pressure within the power steering valve 22 will force the ball valve element 84 to the right against the force of the biasing spring 90 as seen in FIG. 3. This will move the ball valve element 84 out of sealing engagement with the generally conical valve seat 88 to allow fluid to flow from the power steering control valve 22 to the reservoir 16 through the conduit 21.

If the pressure relief valve 72 were omitted, the motor cylinder chambers 40 and 42 would be vented to atmospheric pressure through the conduit 21 and the reservoir 16. Therefore, the pressure within the motor cylinder chambers 40 and 42 would fall below the predetermined pressure. Thus, the pressure relief valve 72 prevents the fluid pressure in the motor cylinder chambers 40 and 42 from falling below the predetermined pressure by blocking the fluid flow from the power steering valve 22 to the reservoir 16 through conduit 21 when the fluid pressure in the motor cylinder chamber 40 or 42 is equal to the predetermined pressure.

During operation of a vehicle in which the power steering system 10 is located, the engine 13 is operated to drive the power steering pump 12. The fluid output from the power steering pump 12 is connected to the power steering valve 22 through the conduit 20. To assist in turning steerable vehicle wheels, the power steering valve 22 is operated to direct the fluid pressure supplied by the power steering pump 12 to either the motor cylinder chamber 40 or 42. The motor cylinder chamber which does not receive fluid pressure is connected to the reservoir 16 through the power steering valve 22 and the conduit 21. Upon completion of the turn, the vehicle core 30 and the valve sleeve 32 of the power steering valve 22 return to a neutral position relative to each other to direct fluid pressure to the motor cylinder chambers 40 and 42 equally.

Upon interruption of operation of the engine 13, the power steering pump 12 becomes inactive and no longer supplies fluid pressure to the power steering valve 22. The fluid pressure supplied to the power steering valve 22 falls to atmospheric pressure. At this time, the pressure within the power steering valve 22 is greater than the pump output pressure and reservoir 16 pressure. Therefore, there is a tendency for the fluid within the power steering valve 22 to flow back to the reservoir 16 through the power steering pump 12 and conduit 20, and through the conduit 21.

The tendency for the fluid to flow back to the reservoir 16 through the power steering pump 12 and the conduit 20 is stopped by the one-way valve 70. The tendency for the fluid to flow to the reservoir 16 through the conduit 21 is stopped by the pressure relief valve 72 when the pressure within the motor cylinder chamber 40 or 42 is equal to the predetermined pressure. If the fluid pressure within the motor cylinder chambers 40 and 42 were above the predetermined pressure when the engine 13 becomes inactive, the pressure relief valve 72 will allow fluid to flow from the power steering valve 22 to the reservoir 16 until the predetermined pressure is obtained.

Therefore, when the power steering pump is no longer operating, the one-way valve 70 and the pressure relief valve 72 will prevent the fluid pressure within the motor cylinder chambers 40 and 42 from falling below the predetermined pressure. When the pressure within the motor cylinder chambers 40 and 42 is at or above the predetermined pressure, seals 64 and 66 will be urged into sealing engagement with the rack bar 48 to prevent fluid from leaking from the power steering motor 24 and foreign material from entering the power steering motor if the seals or rack bar is damaged.

When the engine 13 is driving the power steering pump 12 and the valve sleeve 32 and the spool 30 of the valve assembly 31 are in the neutral position relative to each other, the fluid pressure within the power steering motor chambers 40 and 42 is prevented from falling below the predetermined pressure by the pressure relief valve 72. Therefore, the fluid pressure within the motor cylinder chambers 40 and 42 will be sufficient to urge damaged seals 64 and 66 into sealing engagement with the rack bar 48. Thus, damaged seals 64 and 66 will not leak fluid from the power steering motor 24 or allow foreign material to enter the motor and damage the seals.

When the pressure within the motor cylinder chambers 40 and 42 is equal to or less than the predetermined pressure, the fluid pressure in the power steering valve 22 is not great enough to move the ball valve element 84 of the pressure relief valve 72 to the right as seen in FIG. 3. Thus, the fluid flow from the power steering valve 22 to the reservoir 16 is blocked by the sealing engagement of the ball valve element 84 with the generally conical surface 88 of the pressure relief valve 72. Without any fluid flow to the reservoir 16, the pressure within the motor cylinder chambers 40 and 42 will increase due to the fluid pressure supplied by the power steering pump 12. The fluid pressure within the motor cylinder chambers 40 and 42 will continue to increase until the fluid pressure is greater than the predetermined pressure. At this point, the pressure within the power steering valve 22 is great enough to urge the ball valve element 84 out of engagement with the generally conical surface 88. Therefore, fluid will flow from the power steering valve 22 to the reservoir 16 releasing pressure from the motor cylinder chambers 40 and 42. Once the predetermined pressure is reached in the motor cylinder chambers 40 and 42, the pressure relief valve 72 will close to block fluid flow from the power steering valve 22 to the reservoir 16. Therefore, the pressure relief valve 72 allows fluid to flow from the power steering valve 22 to the reservoir 16 while preventing the fluid pressure within the power steering motor cylinder chambers 40 and 42 from falling below the predetermined pressure.

Since the fluid pressure within the motor cylinder chambers 40 and 42 is prevented from falling below the predetermined pressure, the seals 64 and 66 even if damaged will be urged into sealing engagement with the rack bar 48. This prevents fluid from leaking from the power steering motor 24 and tends to prevent dirt and other foreign materials from entering the motor.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in a power steering system in which a power steering pump is operable from an inactive condition to an active condition to supply fluid under pressure from a reservoir, said apparatus comprising:

a power steering motor connectable with steerable vehicle wheels;

a power steering control valve connected in fluid communication with said power steering motor and operable to control fluid flow from the power steering pump to said power steering motor;

a one-way valve connected in fluid communication with the pump and said power steering control valve to block fluid flow from said power steering control valve to the pump when the pressure within the power steering control valve is greater than the outlet pressure of the pump; and a pressure relief valve connected in fluid communication with said power steering control valve and the reservoir to block fluid flow from said power steering control valve to the reservoir when the fluid pressure in the power steering control valve is less than a predetermined fluid pressure.

2. An apparatus as set forth in claim 1 wherein said power steering motor includes a first part which is movable relative to a second part during operation of said power steering motor, and seal means for blocking fluid flow between said first and second parts, said seal means being urged toward at least one of said first and second parts by fluid pressure in said power steering motor.

3. An apparatus as set forth in claim 1 wherein said power steering control valve includes a housing which encloses a valve assembly, said housing having an inlet port connected in fluid communication with said valve assembly and the power steering pump, said one-way valve being connected with said housing adjacent to the inlet port, said housing having a outlet port connected in fluid communication with the reservoir and said valve assembly, said pressure relief valve being connected with said housing adjacent to the outlet port.

4. A system comprising:

an engine;

a power steering pump connected with said engine and driven by said engine during operation of said engine, said engine being ineffective to drive said power steering pump when said engine is in a non-operating condition;

a power steering motor connectable with steerable vehicle wheels;

a power steering control valve connected in fluid communication with said power steering motor and said power steering pump, said power steering control valve being operable to control fluid flow from said power steering pump to said power steering motor during operation of said engine;

a one-way valve connected in fluid communication with said power steering pump and said power steering control valve to block fluid flow from said power steering control valve to said power steering pump when the engine is in the non-operating condition and is ineffective to drive said power steering pump; and a pressure relief valve connected in fluid communication with said power steering control valve and a power steering fluid reservoir to block fluid flow from said power steering control valve to the power steering fluid reservoir when the fluid pressure in the power steering control valve is less than a predetermined fluid pressure.

5. An apparatus as set forth in claim 4 wherein said power steering motor includes a first part which is movable relative to a second part during operation of said power steering motor, and seal means for blocking fluid flow between said first and second parts, said seal means being urged toward at least one of said first and second parts by fluid pressure in said power steering motor.

6. An apparatus as set forth in claim 4 wherein said power steering control valve includes a housing which encloses a valve assembly, said housing having an inlet port connected in fluid communication with said valve assembly and the power steering pump, said one-way valve being connected with said housing adjacent to said inlet port, said housing having an outlet port connected in fluid communication with the reservoir and said valve assembly, said pressure relief valve being connected with said housing adjacent to said outlet port.

* * * * *